(12) United States Patent
Kozitsky et al.

(10) Patent No.: US 9,460,367 B2
(45) Date of Patent: Oct. 4, 2016

(54) METHOD AND SYSTEM FOR AUTOMATING AN IMAGE REJECTION PROCESS

(71) Applicant: Xerox Corporation, Norwalk, CT (US)

(72) Inventors: Vladimir Kozitsky, Rochester, NY (US); Matthew Shreve, Tampa, FL (US); Aaron M. Burry, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 32 days.

(21) Appl. No.: 14/561,512

(22) Filed: Dec. 5, 2014

(65) Prior Publication Data

US 2016/0148076 A1 May 26, 2016

Related U.S. Application Data

(60) Provisional application No. 62/085,151, filed on Nov. 26, 2014.

(51) Int. Cl.
*G06K 9/00* (2006.01)
*G06K 9/46* (2006.01)
(Continued)

(52) U.S. Cl.
CPC ............. *G06K 9/627* (2013.01); *G06N 99/005* (2013.01)

(58) Field of Classification Search
CPC .. G06K 9/627; G06K 9/033; G06K 2209/15; G06K 9/6256; G06K 9/66; G06K 9/6217; G06K 9/6282; G06N 99/005; G08G 1/0175; G06F 17/30256
USPC ....... 382/100, 103, 104, 105, 155, 159, 161, 382/173, 176, 177, 190, 199, 224
See application file for complete search history.

(56) References Cited

U.S. PATENT DOCUMENTS 5,568,406 A   10/1996   Gerber
6,339,651 B1 *  1/2002   Tian ...................... G06K 9/344
                                                    340/10.1
(Continued)

FOREIGN PATENT DOCUMENTS

CN        103730009 A      4/2014

OTHER PUBLICATIONS

Ahonen, T. et al., "Face Recognition with Local Binary Patterns," IEEE Transactions on Pattern Analysis and Machine Intelligence Oct. 30, 2006, 28(12):2037-2041.

(Continued)

*Primary Examiner* — Sheela C Chawan
(74) *Attorney, Agent, or Firm* — Kermit D. Lopez; Luis M. Ortiz; Ortiz & Lopez, PLLC (57) ABSTRACT

Systems and methods for automating an image rejection process. Features including texture, spatial structure, and image quality characteristics can be extracted from one or more images to train a classifier. Features can be calculated with respect to a test image for submission of the features to the classifier, given an operating point corresponding to a desired false positive rate. One or more inputs can be generated from the classifier as a confidence value corresponding to a likelihood of, for example: a license plate being absent in the image, the license plate being unreadable, or the license plate being obstructed. The confidence value can be compared against a threshold to determine if the image(s) should be removed from a human review pipeline, thereby reducing images requiring human review.

20 Claims, 10 Drawing Sheets

(51) Int. Cl.
*G06K 9/62* (2006.01)
*G06N 99/00* (2010.01)

(56) References Cited

U.S. PATENT DOCUMENTS

| | | | |
|---|---|---|---|
| 6,433,706 B1 | 8/2002 | Anderson, III et al. | |
| 6,473,517 B1 * | 10/2002 | Tyan | G06K 9/344 |
| | | | 382/105 |
| 6,771,819 B2 * | 8/2004 | DeYong | G06K 9/00 |
| | | | 348/126 |
| 6,982,654 B2 | 1/2006 | Rau et al. | |
| 7,340,096 B2 * | 3/2008 | Stauder | G06K 9/3266 |
| | | | 348/E5.022 |
| 8,447,112 B2 * | 5/2013 | Paul | G06K 9/00 |
| | | | 382/105 |
| 8,509,486 B2 | 8/2013 | Hsieh et al. | |
| 8,644,561 B2 * | 2/2014 | Burry | G06K 9/6279 |
| | | | 382/107 |
| 8,781,172 B2 * | 7/2014 | Kozitsky | G06K 9/3258 |
| | | | 340/933 |
| 9,042,647 B2 * | 5/2015 | Kozitsky | G06K 9/00624 |
| | | | 382/171 |
| 9,152,860 B2 * | 10/2015 | Cervin | G06K 9/00483 |
| 9,195,908 B2 * | 11/2015 | Schweid | G06K 9/623 |
| 2012/0148105 A1 | 6/2012 | Burry et al. | |
| 2013/0204719 A1 | 8/2013 | Burry et al. | |
| 2014/0177925 A1 | 6/2014 | Wu et al. | |
| 2014/0254866 A1 | 9/2014 | Jankowski et al. | |
| 2014/0254879 A1 * | 9/2014 | Smith | G06K 9/325 |
| | | | 382/105 |

OTHER PUBLICATIONS

California Vehicle Code Section 4450-4467, http://www.leginfo.ca.gov/cgi-bin/displaycode?section=veh&group=04001-05000&file=4450-4467, printed Dec. 3, 2014, 14 pages.

* cited by examiner

METHOD AND SYSTEM FOR AUTOMATING AN IMAGE REJECTION PROCESS

CROSS-REFERENCE TO PROVISIONAL APPLICATION

This application claims priority under 35 U.S.C. 119(e) to U.S. Provisional Patent Application Ser. No. 62/085,151, entitled "Method and System for Automating an Image Rejection Process," which was filed on Nov. 26, 2014, the disclosure of which is incorporated herein by reference in its entirety.

TECHNICAL FIELD

Embodiments are related to the field of image processing. Embodiments also relate to the field of vehicle recognition. Embodiments further relate to the field of license plate recognition.

BACKGROUND OF THE INVENTION

An LPR (License Plate Recognition) system is a surveillance method that typically utilizes OCR (Optical Character Recognition) on images to read vehicle license plates and other identifying information. Some LPR systems utilize existing closed-circuit televisions or road-rule enforcement cameras, or cameras designed specifically for the surveillance task at hand. LPR systems are employed by various tolling agencies and companies as a method of electronic toll collection on, for example, pay-per-use roads and cataloging the movements of traffic or individuals.

Some LPR systems have been developed, which are composed of several modules, the first of which involves license plate localization where regions of the input image are identified as potentially containing a license plate. These sub images are referred to as 'Region of Interest' (ROI) images. By design, some LPR systems assume that at least one license plate exists in the input image and thus the processing is biased to generate many candidate ROI's to ensure that a license plate is found. This approach would be typical of, for instance, a tolling application wherein images are captured as a vehicle travels through a toll plaza or overhead gantry. Each generated ROI is passed to character segmentation, then OCR, and finally State ID subsystems. An ROI can be rejected at any step of the process.

One of the problems with some current LPR systems is the rejection of valid license plate(s). To illustrate this problem, consider several rejection examples. In one rejection scenario, segmentation may return less than 4 characters. In another rejection scenario, too many gaps may exist between the segmented characters. In still another rejection example, the OCR operation may return a low confidence for all of the characters. Additionally, in some situations, state identification via the state identification module 20 may fail to reach a conclusion.

In this manner, ROI's that do not contain a license plate are likely to be discarded by subsystems downstream from localization. In addition, ROI's that contain a license plate can also be discarded if conditions such as these aren't met as part of the process flow. This highly selective behavior helps the automated OCR solution reduce the number of mistakes that it makes. Given the market requirements for highly accurate OCR (99% or better), LPR systems or engines tend to err on the conservative side, since problematic or difficult to read license plates are risky to evaluate with high confidence.

Since they are highly optimized to meet the demanding market requirements for accuracy, LPR solutions are not usually very good at determining with high accuracy whether there is (or is not) a license plate in a given image. Rather, the LPR system is typically quite good at determining whether there is a license plate in the image that is easy to OCR with high accuracy. This leads to a larger than desired pool of images that are sent for human review (at added cost). For the reasons outlined above, a separate method is required that is optimized for this particular problem. If an LPR returns a highly confident conclusion, then we can assume that a license plate exists, but not the other way around.

In cases where an LPR engine does not return a conclusion or returns a conclusion with confidence below a predetermined accuracy threshold, the images are forwarded to a human for review. A human can take various measures to determine the license plate code and state including inferring various details in cases where the license plate is partially occluded. When a human successfully determines the plate code and state, the driver is then charged a toll (or a fine for a photo-enforcement application). For some fraction of the human reviewed images, there was in fact no readable license plate present in the image. Here the investment in time and cost for a human review is wasted. This can occur when there are image capture triggering problems, image quality problems, occlusions from other objects in the image, improperly mounted plates, or for cases where there is actually no plate physically on the vehicle. The actual absence of a license plate is a particular problem in California where by law VCS 4456, drivers of new vehicles have up to three months (recently reduced from 6) to register the vehicle with the state. Given this, some tolling operations in Los Angeles, for example, are seeing approximately 15% of traffic without license plates, which leads to a corresponding human review expense.

Tolling images, which have fundamental readability problems are first labeled with the type of problem and then are rejected from billing. The process of describing why an image is not readable is called the 'image reject process' (IRP). Missing license plates are one category of 'rejects'.

Other methods exist for attempting to detect objects of interest in images. An example is that of a face detector, which has become commonplace in digital cameras today. In fact, as part of any LPR system, some form of license plate detector will likely be used to identify candidate regions of interest where further processing should be applied. In some situations, an image-based classifier (license plate detector) based on SMQT features and the SNoW classifier to identify candidate ROIs may be employed.

For any object detection/classification problem, there is a tradeoff between what are called "missed detections" and "false alarms". In fact, common practice in this space is to develop a receiver operating characteristic (ROC) curve that enables one to select the desired operating point—i.e. the "best" tradeoff between false alarms and missed detections for the application of interest.

For the application of screening images from the human review pool, any image that is not sent for human review means that any associated toll cannot be collected. Thus, a "false alarm" by the automated detection method—identifying an image as not having a plate when in fact it does—translates directly into lost revenue. So, in order to be a viable option for automatically screening images from the human review pool, an object detection method has to meet extremely aggressive performance requirements, for example, a maximum false alarm rate of 0.5%.

Unfortunately standard object detection methods, including the SMQT/SNoW classifier used by LPR systems, do not provide sufficient performance for accurately identifying whether there is a license plate in an image or not. Existing classification/detection approaches provided insufficient yield (accurately detected images that don't contain license plates) at the required false alarm rate. The present invention addresses this gap by leveraging a specific combination of image features and classification methods as part of an overall LPR process flow that achieves the required performance targets.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved image-processing systems and methods.

It is another aspect of the disclosed embodiments to provide for systems and methods for determining, with very high accuracy, if an image is missing a license plate.

The aforementioned aspects and other objectives and advantages can now be achieved as described herein. Systems and methods for automating an image rejection process are disclosed. Features are extracted from an image to train a no-plate classifier in a training phase. Such features are employed in a testing phase as input to a classifier, given an operating point corresponding to a desired false positive rate. One or more outputs can then be generated from the classifier as a confidence value corresponding to the likelihood of a license plate being absent in the image, that the license plate is not readable, or that the license plate is obstructed. A confidence value can then be compared against a threshold to determine if the image should be removed from a human review pipeline, thereby reducing the number of images requiring human review.

The disclosed embodiments provide a new approach for determining, with very high accuracy, if an image is missing a license plate. High accuracy is required to minimize false positives (cases where we identify the image as not having a visible plate when in fact it does) which directly lead to loss of revenue. The disclosed embodiments includes two phases: training and testing. In both phases, local license plate specific features as well as global image features are extracted. In training, these features are used to train the no-plate classifier. In testing, given an operating point corresponding to the desired false positive rate (FPR), the features are used as inputs to a classifier. One or more outputs from this classifier can offer a confidence value corresponding to the likelihood of a license plate being absent, obstructed or simply not readable. The confidence is compared against a threshold to determine if the image should be removed from the human review pipeline.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
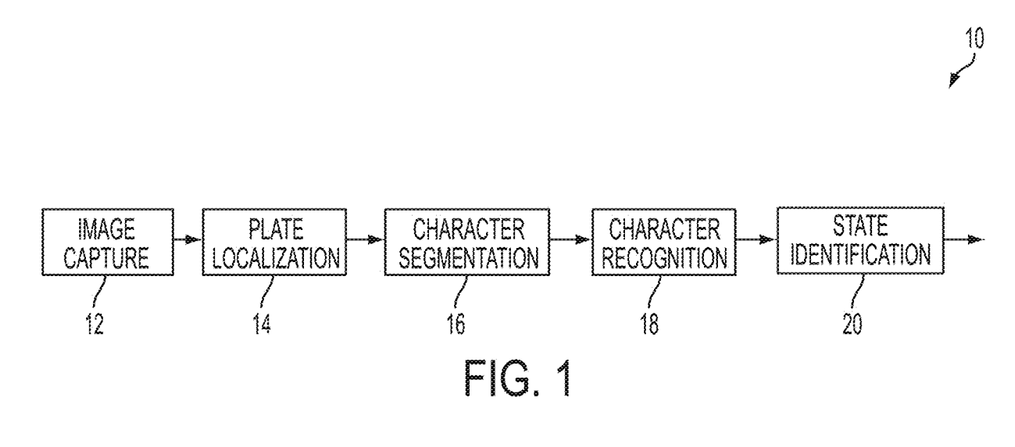
FIG. 1 illustrates a block diagram depicting the basic architecture of an example LPR (License Plate Recognition) system.

FIG. 1 illustrates a block diagram depicting the basic architecture of an example LPR system 10, which can be adapted for use with one or more example embodiments. System 10 includes a number of modules including, for example, an image capture module 12 for capturing an image of, for example, an automobile. Data from the image capture module 12 is input to a plate localization module 14, which in turn outputs data that is provided to a character segmentation module 16. Thereafter, a character recognition module 18 receives the character segmentation data from the character segmentation module 16 and performs a character recognition operation. Data from the character recognition module 18 is then provided as input to a state recognition module 20 to identify the particular state associated with the license plate originally captured via the image capture module 12.

Figure 2:
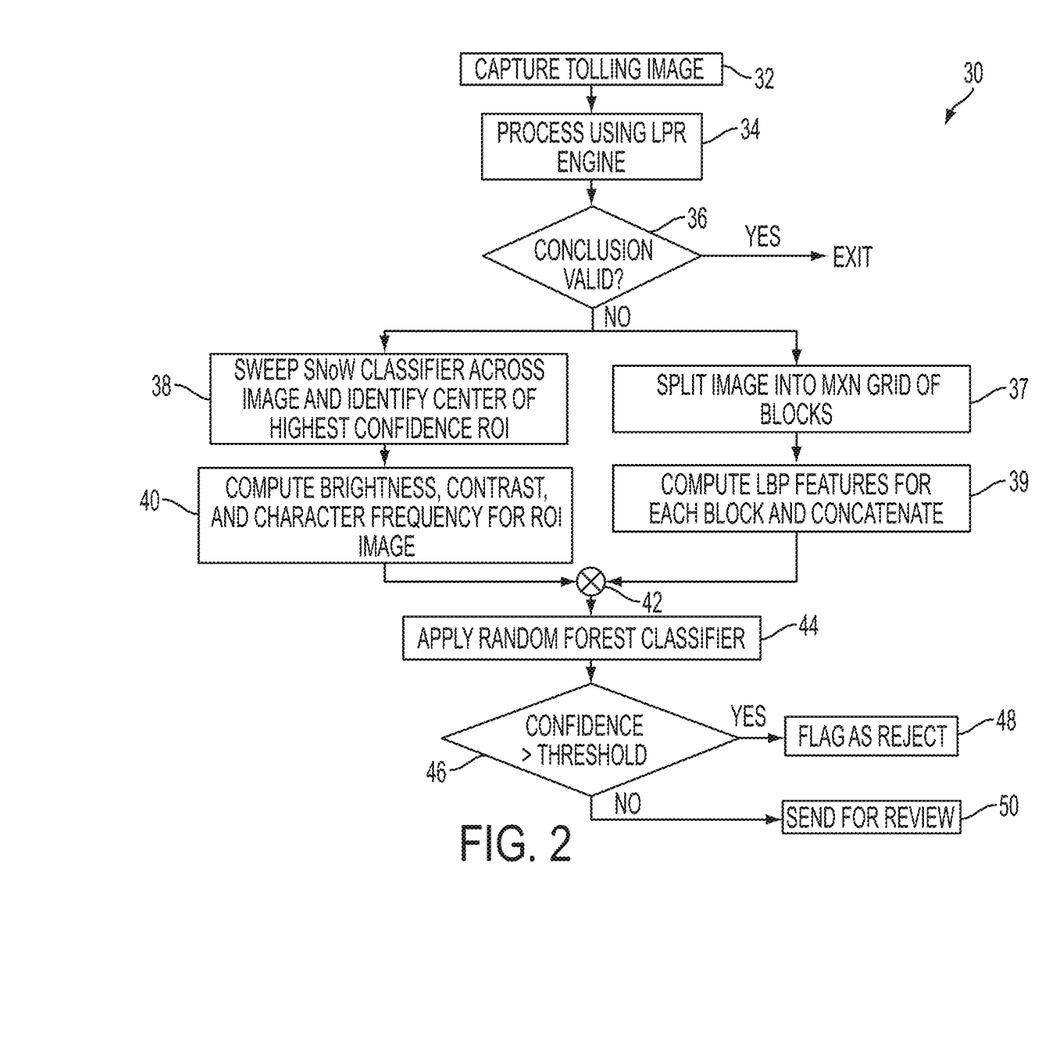
FIG. 2 illustrates a high-level flow chart of operations depicting logical operational steps of a method for automating an image rejection process, in accordance with a preferred embodiment.

FIG. 2 illustrates a high-level flow chart of operations depicting logical operational steps of a method 30 for automating an image rejection process, in accordance with a preferred embodiment. The method 30 depicted in FIG. 2 can be implemented for identifying no plate images with high accuracy, such that such images can be effectively excluded from human review.

Figure 12:
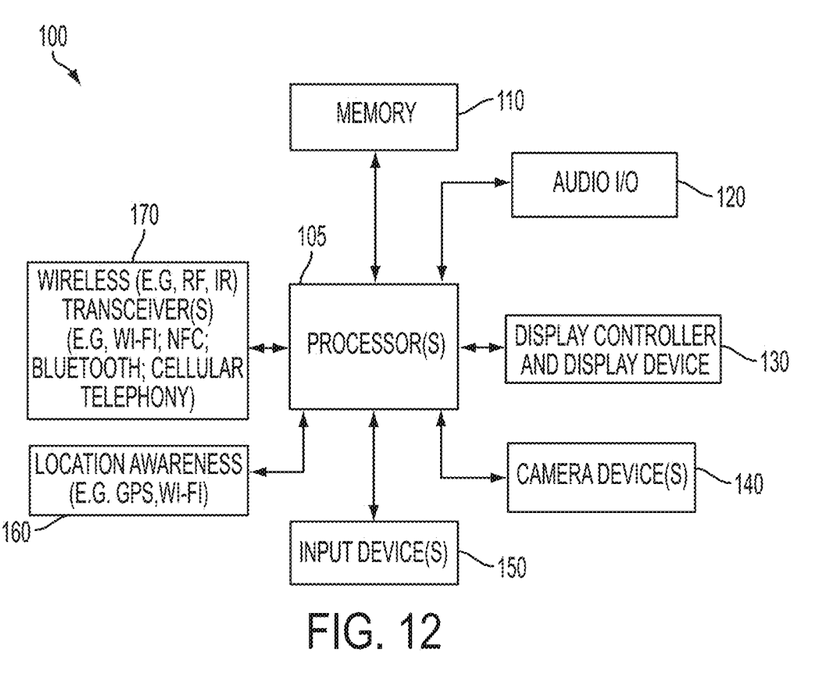
FIG. 12 illustrates a block diagram of an example of a data processing system suitable for use with one or more of the disclosed embodiments.

As shown at block 32, a tolling image may be captured via, for example, a camera such as camera(s) 140 depicted in FIG. 12. Thereafter, as indicated at block 34, the captured tolling image (or Images) can be processed using an LPR engine or system, such as, for example, the LPR engine/system 10 shown in FIG. 1. Following processing of the operation described at block 34, a test can be performed to determine if a valid conclusion has been reached, as indicated at block 36. A valid conclusion is one where the confidence exceeds a predetermined threshold of acceptability such that the long term error rate of such conclusions is, as an example, 5% or less. If so, the process exits. If not, two processing paths can be implemented.

The first processing path is indicated by blocks 38 and 40, and the second processing path by blocks 37 and 39. As shown at block 38, an operation can be implemented to sweep a SnoW classifier across the image and identify the highest confidence ROI. Then, as shown at block 40, an operation can be processed to compute brightness, contrast, and character frequency for the ROI image. The operation depicted at block 37 involves splitting the image into an m×n grid of blocks. Thereafter, as indicated at block 39, an operation can be implemented to compute LBP (Local Binary Pattern) features for each block and then concatenate into a single feature vector.

The resulting output (i.e., output from blocks 40 and 39) can be combined, as indicated at block 42 followed by application of a classifier such as, for example, a random forest classifier, as depicted at block 44. The classifier can be employed to "bag" or bootstraps an ensemble of decision trees that are each individually trained on random partitions of a training set. Each decision tree is a graph like structure where branches are defined based on the probabilities of a particular feature having a specific value or a range of values. Parameters for this classifier can include the number of decision trees, a cost matrix (e.g., penalty or weight applied to decision trees for making an incorrect prediction), and a weighting matrix (e.g., bias one of the two classes). Note that the disclosed embodiments are not limited to the use of a random forest classifier. Other types of classifiers may be implemented in place of or in association with such a classifier.

Following processing of the operation shown at block 44, a test can be performed as depicted at block 46 to determine if confidence data (e.g., a confidence value) is greater than a threshold value. If "yes", then an operation to flag the result as rejected is implemented, as illustrated at block 48. If "no", then an operation to send for human review can be implemented, as depicted at block 50. The operations shown at blocks 46, 48, and 50 involve a voting scheme that can be used to collect all the predictions from each of the decision trees to form a final prediction (or label). In one example embodiment, 100 decision trees may be used and the cost and weighting matrix are empty (zeros). A sole output can thus be generated from the classifier as a confidence value corresponding to the likelihood of a license plate being absent in the image, or a likelihood that the license plate is not readable, or the likelihood that the license plate is obstructed in some capacity.

Figure 3:
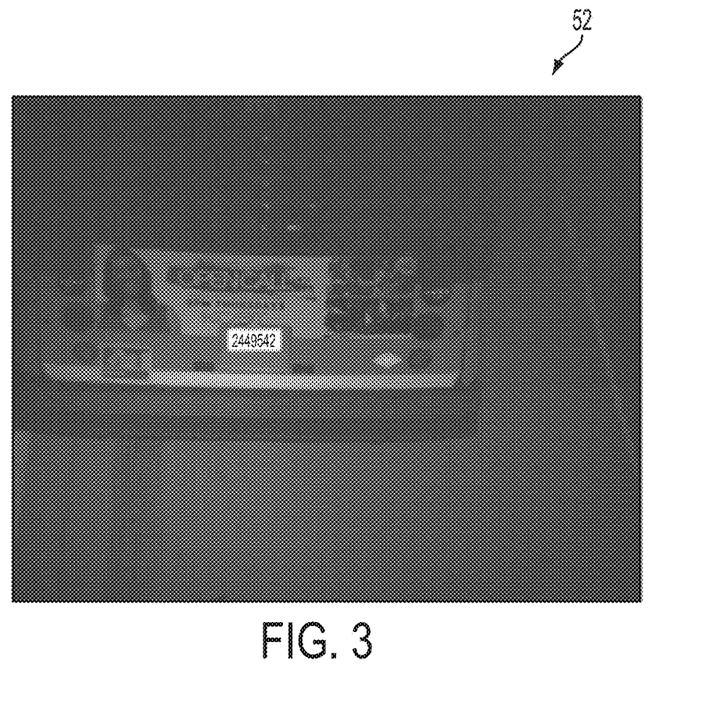
FIG. 3 illustrates an example tolling image, which may be captured in accordance with a preferred embodiment.

FIG. 3 illustrates an example tolling image 52, which may be captured per the operation depicted at block 32 of FIG. 2, in accordance with a preferred embodiment. An image can be captured using cameras installed, for example, in the field as part of a tolling infrastructure. The image may be resized, cropped, or enhanced as a preprocessing step to improve readability. The example image 52 can be used to demonstrate the process flow shown in FIG. 2 and in particular, the operation depicted at block 32. The example image 52 can be initially processed by an LPR engine trained to return high accuracy conclusions for the particular installation, as shown at block 34 in FIG. 2. The confidence of the LPR engine's result can be compared to the confidence required to meet an error requirement as described at block 36 in FIG. 2. If the confidence is sufficiently high, an assumption can be made that a license plate exists and the process exits. Otherwise, operations are implemented to evaluate the existence of a license plate, as described at blocks 38, 40 and 37, 39 of FIG. 2 and so on.

As indicated previously, the operation depicted at block 38 involves a sweep of a SNoW classifier across the image. That is, a classifier is swept in a 2D manner across the input image and a heat-map of a classifier response is generated. This heat map is low-pass filtered to remove noise and then the highest point of the filtered map is selected as the center of the most likely ROI. A rectangle of pixels with height H and width W centered at the most likely location is extracted from the input image and treated as the actual ROI. In one embodiment, only one ROI may be extracted; however, this approach can be expanded to extract the top N ROI's. The values for H and W can be selected to ensure that all captured license plates will fit inside an ROI of dimensions H×W with some small margin. In an example implementation, H is 50 and W is 140 pixels. In one embodiment, this image-based classification can be performed at multiple scalings of the input image or classifier to make the process more robust to the size of the license plate in the input images.

Figure 4:
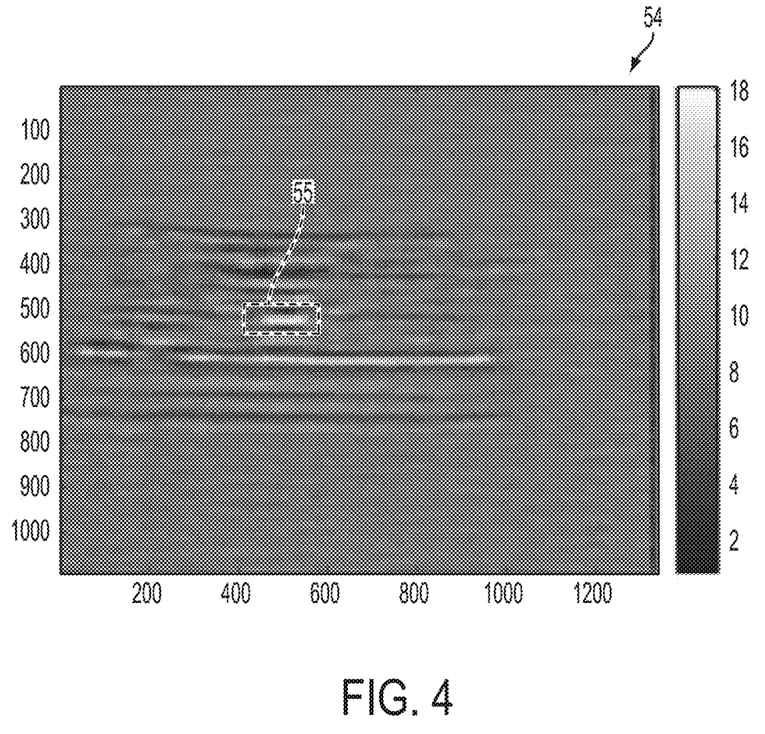
FIG. 4 illustrates a sample graph of the response of a SnoW classifier when swept across an input image, in accordance with a preferred embodiment.
Figure 5:
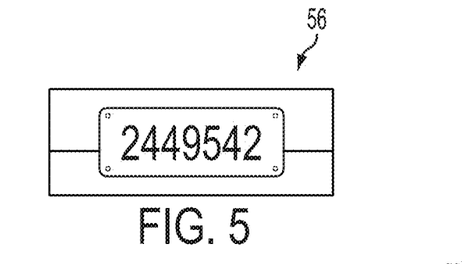
FIG. 5 illustrates a sample image of an extracted ROI (Region of Interest) in accordance with a preferred embodiment.

FIG. 4 illustrates a sample graph 54 of the response of a SnoW classifier when swept across an input image, in accordance with a preferred embodiment. Graph 54 depicts a filtered heat-map and a bounding box 55, which can be used around the point with the greatest classifier response. The coordinates of such a bounding box can be used to extract the ROI from the original image. This ROI is illustrated in FIG. 5. That is, FIG. 5 illustrates a sample image 56 of an extracted ROI (Region of Interest) in accordance with a preferred embodiment.

As indicated previously, the operation illustrated at block 40 in FIG. 2 involves computing brightness, contrast, and character frequency for the ROI. In addition to the confidence returned by the SNoW classifier as indicated at block 38 of FIG. 2, three features can be calculated for the ROI image. Contrast and brightness are calculated as indicated at block 40 in FIG. 2 by analyzing the CDF of the ROI histogram. An example ROI and its corresponding histogram is thus shown respectively in FIGS. 5 and 6.

Figure 6:
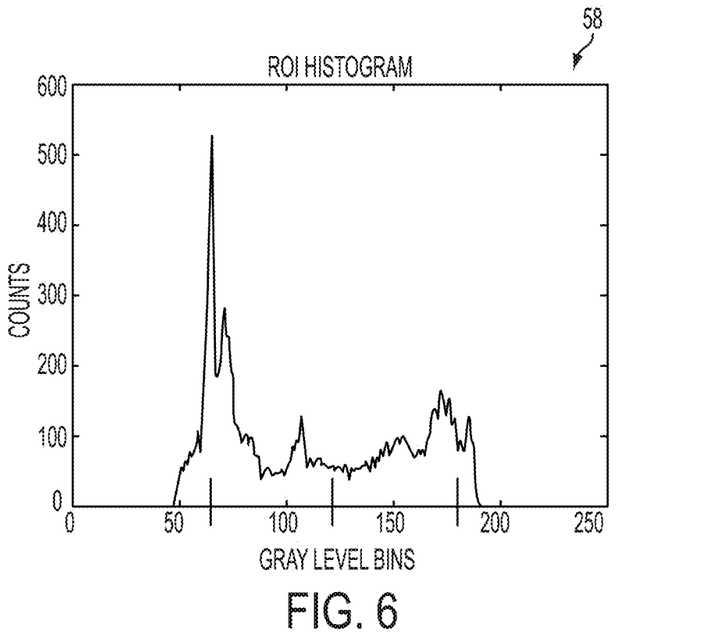
FIG. 6 illustrates an example histogram of an ROI with 10%, 50%, and 90% CDF (Cumulative Distribution Function) bins highlighted.

FIG. 6 illustrates an example histogram 58 of an ROI with 10%, 50%, and 90% CDF (Cumulative Distribution Function) bins highlighted. Each histogram can include 255 bins corresponding to 8-bit gray levels for the ROI. Three bins can be identified using the CDF to determine the gray level for 10, 50, and 90% of pixels. Brightness can be taken as a gray level at the 50% CDF value and contrast is the difference between 90% and 10% CDF values. For lower contrast images, most pixels fall into a narrow range producing tight histograms and low CDF differences.

Figure 7:
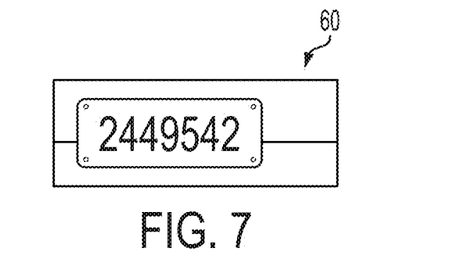
FIG. 7 illustrates an example cropped ROI, in accordance with a preferred embodiment.
Figure 8:
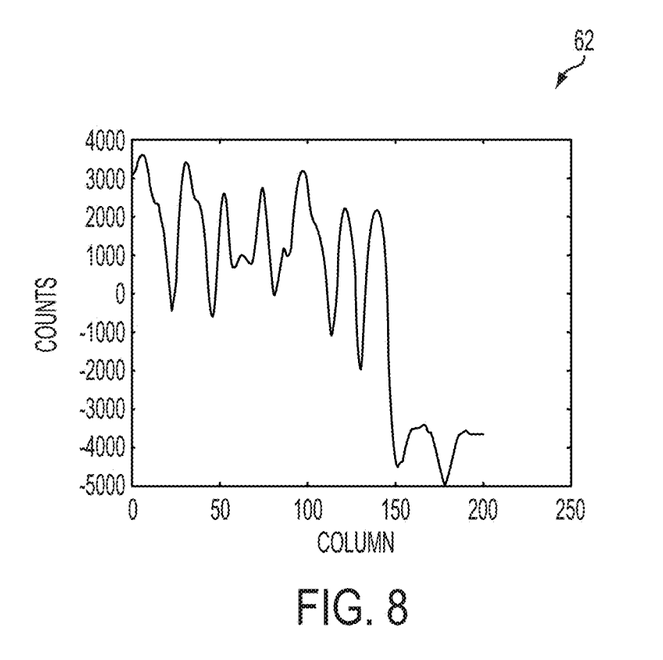
FIG. 8 illustrates a graph depicting data indicative of a column profile of cropped ROI, in accordance with a preferred embodiment.
Figure 9:
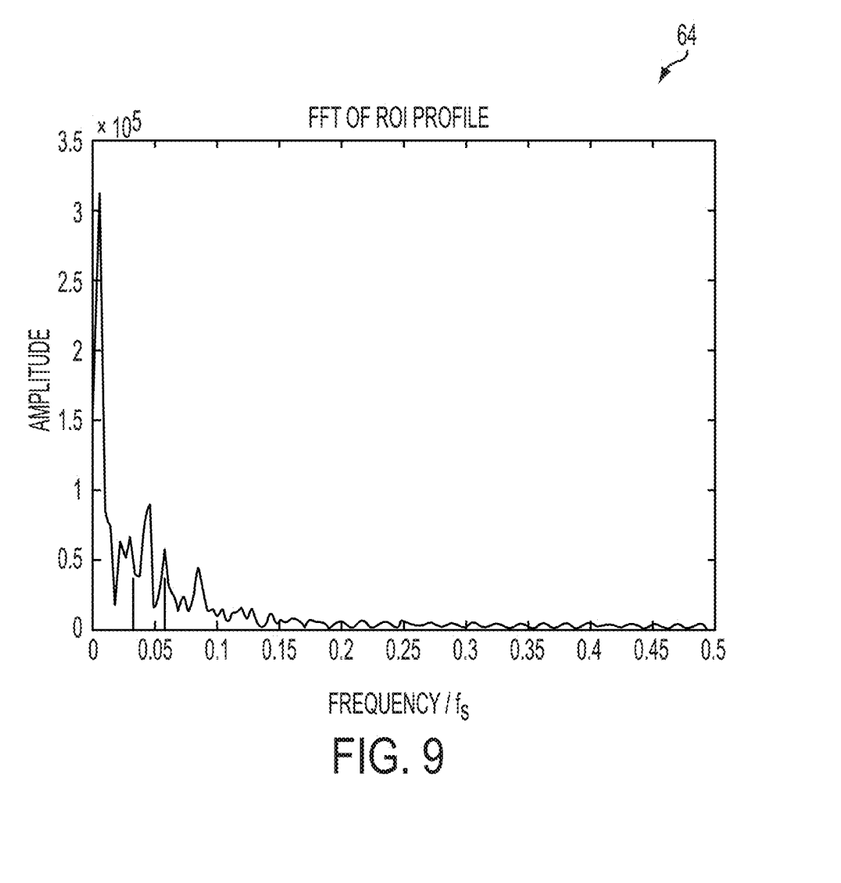
FIG. 9 illustrates a graph depicting an FFT (Fast Fourier Transform) of column profile with a sub region identified, in accordance with a preferred embodiment.

FIG. 7 illustrates an example cropped ROI 60, in accordance with a preferred embodiment. FIG. 8 illustrates a graph 62 depicting data indicative of a column profile of cropped ROI, in accordance with a preferred embodiment. FIG. 9 illustrates a graph 64 depicting an FFT (Fast Fourier Transform) of column profile with a sub region identified, in accordance with a preferred embodiment.

The last feature calculated for the ROI is a measure of character frequency. The calculation can be carried out as follows:

1. The ROI image can be cropped where an equal percentage of top and bottom rows are discarded leaving the center of the ROI. In this approach we crop until 55% of rows remain (see, for example, FIG. 7).
2. A column sum of gray values can be carried out on the cropped ROI image returning a profile. The mean is subtracted from each point of the profile (see, for example, FIG. 8).
3. An FFT can be applied to the zero-mean profile. (See, for example, FIG. 9)
4. The FFT amplitude can be summed to return the total amplitude.
5. The FFT amplitude corresponding to frequencies between fLow and fHigh can be summed returning the total character frequency amplitude. (See, for example, FIG. 9)
6. The ratio of character frequency amplitude determined by the operations at blocks 37 and 39 of FIG. 2 vs. the total of the value output from the operation depicted at block 44 of FIG. 2 can be returned as the result.

The general idea is that for cases where the ROI contains the license plate, there will be more energy in the frequency spectrum corresponding to spacing of characters.

Turning again to the operation illustrated at block 37 of FIG. 2, the image can be split into m×n windows. That is, the entire image frame can then be split into m×n (rows, cols) windows. The choice of m and n will determine the amount of spatial locality that is preserved. The operation indicated at block 39 of FIG. 2 involves extracting LBP (Local Binary Pattern) features for each window along with a concatenate operation. For each window, an LBP histogram can be calculated.

The LBP feature is a local descriptor that assigns an 8-bit "texture" value for each pixel in the image. It is based on the difference in values between the center pixel and its eight neighbors at a specific radius. If the radius is fixed to one, the neighborhood consists of the immediate 8 surrounding pixels. Each of these neighbors corresponds to a bit, and is assigned a value of one if its value is greater than the center pixel and a zero otherwise. These eight bits (which are typically ordered by starting at the value to the immediate left of the center and moving clockwise) form the final LBP byte. Specifically, the byte for a pixel at position $I_c$ can be encoded by the relationship to its neighbors $I_n$ as demonstrated in the following equations (1) and (2):

$$LBP(I_c) = \sum_{n=0}^{7} 2^n f(I_c, I_n) \text{ where} \quad (1)$$

$$f(I_c, I_n) = \begin{cases} 1 & \text{if } I_c \geq I_n \\ 0 & \text{otherwise} \end{cases} \quad (2)$$

Figure 10:
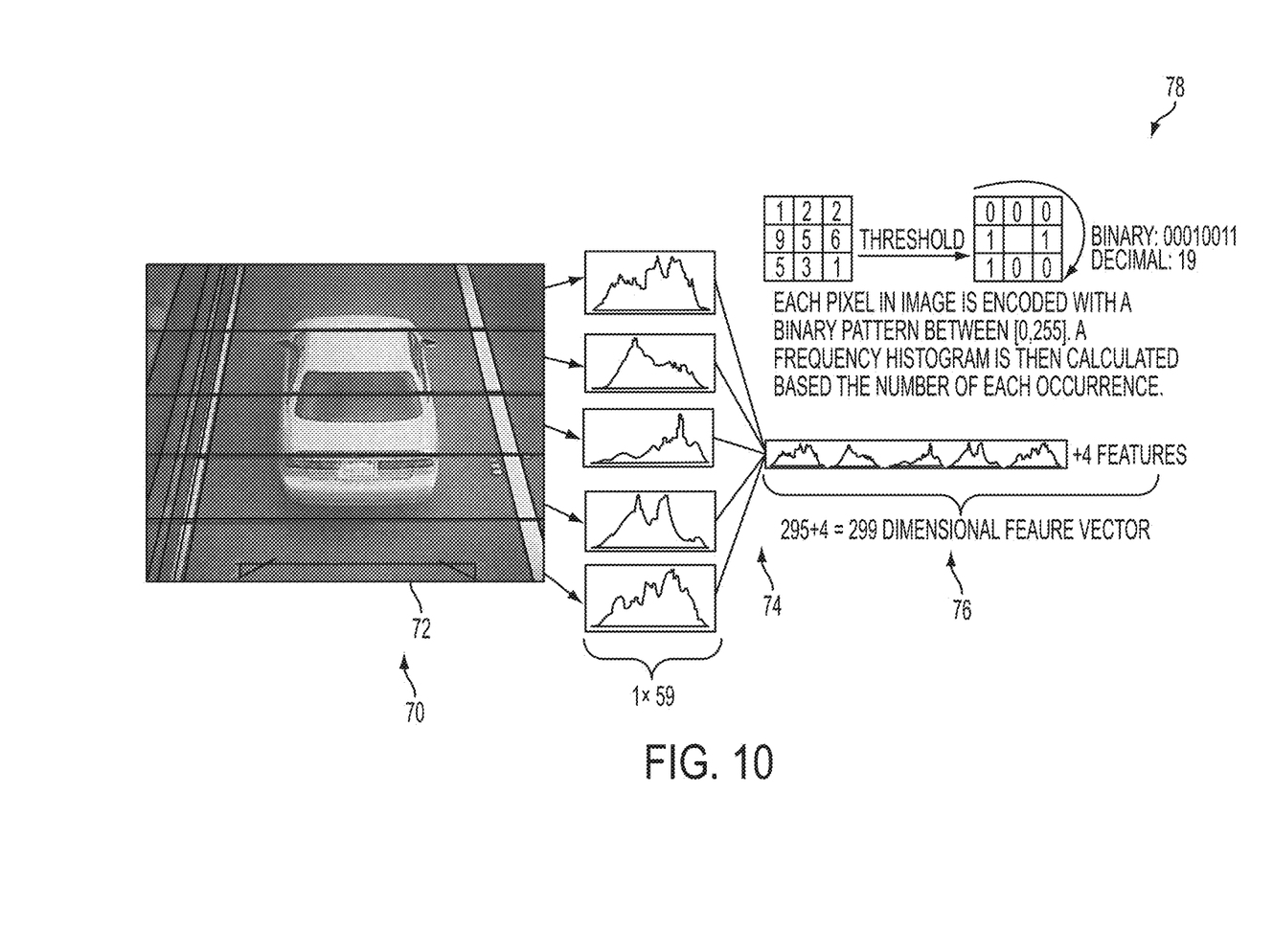
FIG. 10 illustrates a schematic diagram of an LBP (Local Binary Pattern) feature extraction operation, in addition to 4 features describing brightness, contrast, character frequency, and the ROI with the highest confidence, in accordance with a preferred alternative embodiment.

FIG. 10 illustrates a schematic diagram 70 of LBP (Local Binary Pattern) feature extraction operation, in accordance with a preferred alternative embodiment. The standard LBP operator extracts several different orientations and types of edge features in the image, giving equal priority for all patterns found. However, some patterns occur more frequently and in fact contain the majority of textural information (over 85%). These patterns are called "uniform patterns" and consist of those byte values which have at most 2 binary transitions 78 starting at the left or right most bit and moving to the opposite side. For example 11001111, 00011111, and 11111111 are uniform patterns since they contain two, one, and zero transitions, respectively. However, 11001010, 00010010, and 01010111 are not since they each contain more than 2 transitions (five, four, and five). Overall, there are 58 uniform patterns (out of 256 total patterns). After encoding each pixel in the image with a byte value, a histogram 74 can then be generated that spans 58 different uniform patterns, with a 59th bin that collects all other non-uniform patterns. In the example embodiment depicted in FIG. 10, m=5, n=1. The 4 features appended to the LBP feature vector in this figure are the ROI confidence, brightness, contrast, and character frequency as determined by the operations of blocks 38 and 40 depicted in FIG. 2. The dimensional feature vector 76 is depicted graphically in FIG. 10 as the output of the histogram(s) 74.

Figure 11:
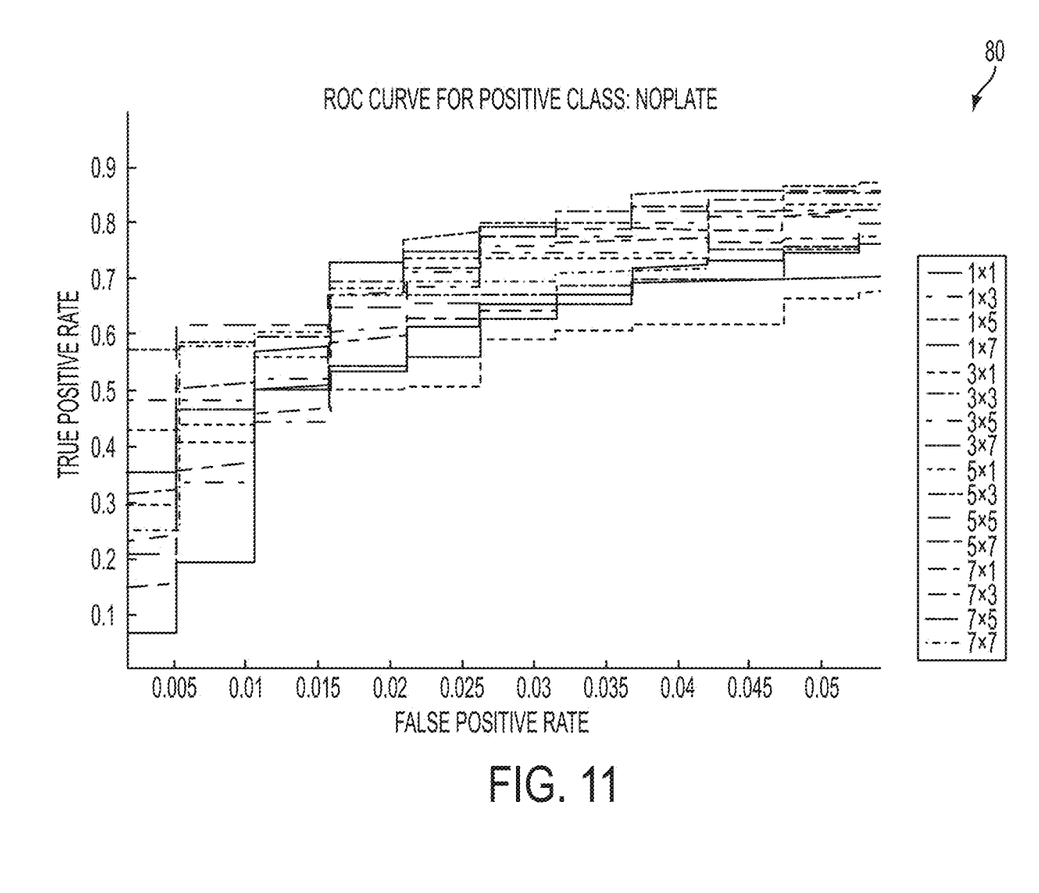
FIG. 11 illustrates a graph depicting the results of a five-fold cross validation on "NoPlate" classification at various choices of window splits, in accordance with a preferred embodiment.

FIG. 11 illustrates a graph 80 depicting the results of a five-fold cross validation on "NoPlate" classification at various choices of window splits, in accordance with an alternative embodiment. The data shown in graph 80 is based on a testing of the performance on a total of 1995 vehicles (e.g., 395 had no plates, 1600 had plates). The results from selecting various LBP window sizes are shown in FIG. 11. In this embodiment, a choice of m=1 and n=5 leads to optimal results at an FPR=0.005. It can be appreciated, of course, that the graph 80 shown in FIG. 11 is presented for general illustrative purposes only and is not considered a limited feature of the disclosed embodiments.

The embodiments are described at least in part herein with reference to flowchart illustrations and/or schematic/block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

FIG. 12 illustrates a block diagram of an example data processing system 100 in which applications implementing the disclosed method/system may be implemented. The data processing system 100 includes a processor 105 with one or more microprocessors. The system 100 also includes memory 110 for storing data and programs for execution by the processing system. The system 100 additionally includes an audio input/output subsystem 120 which may include, for example, a microphone and a speaker.

A display controller and display device 130 can be used to provide a graphical user interface for the user, such as the graphics user interface provided by mobile devices such as, for example, an Android-based mobile device, the iPhone, iPad, etc. Additionally, the display and audio functionality can be coupled to provide video playback or video communication services. A wireless transceiver 170 can transmit and receive data via one or more wireless technologies such as, for example, Near Field Communication (NFC), Wi-Fi, infrared, Bluetooth, or one or more variants of wireless cellular technology.

One embodiment of system 100 can contain one or more camera devices 140 configured in both a front and rear facing configuration, though similarly configured systems each with a front facing camera, or no camera, can be one of many optimal configurations. In a preferred embodiment, however, camera(s) 140 are desirable because camera 140 (e.g., a video surveillance camera) can be positioned to capture images of a passing vehicle, such as shown at block 12 in FIG. 1 (i.e., an image capturing operation) and block 32 in FIG. 2 (i.e., capture tolling image).

The data processing system 100 can include one or more input devices 150 that allow a user to provide input to the system. Input devices can include a keypad or keyboard, alone or in conjunction with a voice recognition system, or a touch or multi-touch panel that is overlaid on the display device 130. Additionally, embodiments of the data processing system 100 can also include a device for providing location awareness services, such as a Global Positioning System (GPS) device 160 or its equivalent.

It is to be noted that the data processing system 100 as represented in FIG. 12 is by way of example. One or more buses or interfaces, which are not shown, can be used to interconnect the various components, as is well known in the art. As well, additional components, not shown, may also be part of the system 100 in certain embodiments, and in certain embodiments, fewer components than shown in FIG. 12 may also be used.

Figure 13:
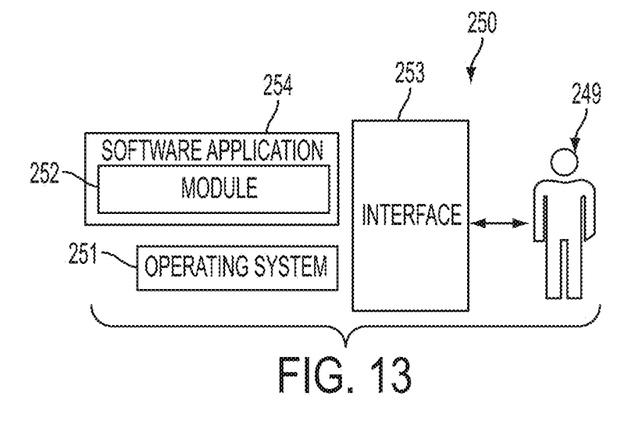
FIG. 13 illustrates a schematic view of a software system including a module, an operating system, and a user interface, in accordance with one or more of the described embodiments.

FIG. 13 illustrates a computer software system 250 for directing the operation of the data-processing system 100 depicted in FIG. 12. Software application 254, stored in main memory 110 and/or on a server, generally includes a kernel or operating system 251 and a shell or interface 253. One or more application programs, such as software application 254, may be "loaded" (i.e., transferred from the memory 110 and/or for example, server for execution by the data-processing system 100). The data-processing system 100 can receive user commands and data through, for example, the user interface 253; these inputs may then be acted upon by the data-processing system 100 in accordance with instructions from operating system 251 and/or software application 254 typically embodied in a module such as module 252.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application. An example of a "module" is module 252 shown in FIG. 13, which may be in some embodiments, an "app" as discussed earlier herein. In other embodiments, the module 252 may comprise an app that runs on a mobile electronic device and/or associated software running on a server.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 253, which is preferably a graphical user interface (GUI), also serves to display results, whereupon a user 249 may supply additional inputs or terminate the session. In some example embodiment, operating system 251 and interface 253 can be implemented in the context of a single OS or with multiple different OS types (e.g., Android, Apple, Windows, Mac, Linux, etc.). Software application 254 thus can include a module 252 having instructions for carrying out, for example, operations such as those shown and described herein with in FIG. 2 (e.g. see the instructions shown at blocks 32, 34, 36, 37, 38, 39, 40, 42, 44, 46, 46, and 50 of method 30).

FIGS. 12-13 are thus intended as examples and not as architectural limitations of the disclosed embodiments. Additionally, such embodiments are not limited to any particular application or computing or data-processing environment. Instead, those skilled in the art will appreciate that the disclosed approach may be advantageously applied to a variety of systems and application software.

Based on the foregoing, it can be appreciated that a number of embodiments, preferred and alternative, are disclosed herein. For example, in one embodiment a method for automating an image rejection process can be implemented. Such a method can include the steps or logical operations of, for example: extracting features from one or more images among a batch of images to train a classifier, the features including, for example, texture, spatial structure, and image quality characteristics; calculating the features with respect to a test image for submission of the features to the classifier, given an operating point corresponding to a desired false positive rate; generating at least one output from the classifier as a confidence value corresponding to a likelihood of at least one of the following: a license plate being absent in the image, the license plate being unreadable, or the license plate being obstructed; and comparing the confidence value against a threshold to determine if the image(s) should be removed from a human review pipeline, thereby reducing images requiring human review. The images can be captured via an image-capturing unit (e.g., video surveillance camera, etc.). In some embodiments, the image(s) can be processed via an LPR engine after the images are captured via the image-capturing unit.

In yet other embodiments, steps or logical operations can be implemented for sweeping an image-based classifier across the image(s) to identify a center of highest confidence ROI with respect to the image; and computing a brightness, a contrast, and a character frequency for an ROI in the image(s). In other embodiments, the image-based classifier may be, for example, a SNoW classifier.

In still other embodiments, the step or logical operation for extracting features from one or more images among a batch of images to train a classifier can include, for example, steps or logical operations for splitting the image(s) into an m×n grid of blocks; and computing LBP features for blocks among the m×n grid of blocks to concatenate the LBP features.

In another embodiment, a system for automating an image rejection process can be implemented. Such a system can include, for example, one or more processors and at least one memory comprising instructions stored therein, which when executed by the processor(s), causes the processor(s) to perform operations including, for example: extracting features from one or more images among a batch of images, the features to train a classifier, the features comprising texture, spatial structure, and image quality characteristics; calculating the features with respect to a test image for submission of the features to the classifier, given an operating point corresponding to a desired false positive rate; generating at least one output from the classifier as a confidence value corresponding to a likelihood of at least one of the following: a license plate being absent in the image(s), the license plate being unreadable, or the license plate being obstructed; and comparing the confidence value against a threshold to determine if the image(s) should be removed from a human review pipeline, thereby reducing images requiring human review.

In yet another embodiment, a system for automating an image rejection process can be implemented. Such a system can include, for example, one or more image-capturing units, one or more processors that communicate electronically with the image-capturing unit(s), and a memory (or memories) including instructions stored therein, which when executed by the processor(s), cause the processor(s) to perform operations that include, for example: extracting features from at least one image among a batch of images to train a classifier, the features comprising texture, spatial structure, and image quality characteristics, wherein the image(s) are captured by the image-capturing unit; calculating the features with respect to a test image for submission of the features to the classifier, given an operating point corresponding to a desired false positive rate; generating at least one output from the classifier as a confidence value corresponding to a likelihood of at least one of the following: a license plate being absent in the image(s), the license plate being unreadable, or the license plate being obstructed; and comparing the confidence value against a threshold to determine if the image(s) should be removed from a human review pipeline, thereby reducing images requiring human review.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A method for automating an image rejection process, said method comprising:
    extracting features from at least one image among a batch of images utilizing an LBP (Local Binary Pattern) operator to train a classifier, said features comprising texture, spatial structure, and image quality characteristics, wherein said LBP operator extracts several different orientations and types of edge features in said at least one image, giving equal priority for all patterns found;
    calculating said features with respect to a test image for submission of said features to said classifier, given an operating point corresponding to a desired false positive rate;
    generating at least one output from said classifier as a confidence value corresponding to a likelihood of at least one of the following: a license plate being absent in said image, said license plate being unreadable, or said license plate being obstructed; and
    comparing said confidence value against a threshold to determine if said at least one image should be removed from a human review pipeline, thereby reducing images requiring human review.

2. The method of claim 1 wherein said classifier comprises a random forest classifier.

3. The method of claim 2 further comprising processing said at least one image using an LPR (License Plate Recognition) engine after capturing said at least one image via said image-capturing unit.

4. The method of claim 1 wherein extracting features from at least one image among a batch of images to train a classifier, said features comprising texture, spatial structure, and image quality characteristics, further comprises:
    splitting said at least one image into an m×n grid of blocks; and
    computing at least one LBP feature among said features for each block among said m×n grid of blocks to concatenate said at least one LBP feature into a single feature vector, said at least one LBP feature comprising said features including said texture, said spatial structure and said image quality characteristics, said at least one LBP feature comprising a local descriptor that assigns with respect to said texture an 8-bit texture value for each pixel in said at least one image, wherein said 8-bit texture value is based on a difference in values between a center pixel and eight neighbors of said center pixel at a specific radius.

5. The method of claim 1 further comprising initially capturing said at least one image via an image-capturing unit.

6. The method of claim 1 further comprising;
    sweeping an image-based classifier across said at least one image to identify a center of highest confidence ROT with respect to said at least one image; and
    computing a brightness, a contrast, and a character frequency for an ROI in said at least one image.

7. The method of claim 6 wherein said image-based classifier comprises a SNoW (Sparse Network of Winnows) classifier.

8. The method of claim 4 further comprising;
sweeping an image-based classifier across said at least one image to identify a center of highest confidence ROI with respect to said at least one image; and
computing a brightness, a contrast, and a character frequency for an ROI in said at least one image.

9. The method of claim 4 wherein said image-based classifier is swept in a 2D manner across said at least one image and a heat-map of a classifier response of said image-based classifier is then generated wherein said heatma is low-filtered to remove noise and then a highest point of the filtered heat-map is selected as said center of highest confidence ROI with respect to said at least one image.

10. A system for automating an image rejection process, said system comprising:
at least one processor; and
a memory comprising instructions stored therein, which when executed by said at least one processor, cause said at least one processor to perform operations comprising:
extracting features from at least one image among a batch of images utilizing an LBP (Local Binary Pattern) operator to train a classifier, said features comprising texture, spatial structure, and image quality characteristics, wherein said LBP operator extracts several different orientations and types of edge features in said at least one image, giving equal priority for all patterns found;
calculating said features with respect to a test image for submission of said features to said classifier, given an operating point corresponding to a desired false positive rate;
generating at least one output from said classifier as a confidence value corresponding to a likelihood of at least one of the following: a license plate being absent in said at least one image, said license plate being unreadable, or said license plate being obstructed; and
comparing said confidence value against a threshold to determine if said at least one image should be removed from a human review pipeline, thereby reducing images requiring human review.

11. The system of claim 10 wherein said classifier comprises a random forest classifier.

12. The system of claim 10 further comprising an image-capturing unit that communicates electronically with said at least one processor and said memory, wherein said operations further comprise initially capturing said at least one image via said image-capturing unit.

13. The system of claim 12 wherein said at least one processor processes said at least one image using an LPR engine after capturing said at least one image via said image-capturing unit.

14. The system of claim 10 further comprising:
an image-based classifier that sweeps across said at least one image to identify a center of highest confidence ROT with respect to said at least one image; and
wherein said operations further comprise computing a brightness, a contrast, and a character frequency for an ROT in said at least one image.

15. The system of claim 14 wherein said image-based classifier comprises a SNoW classifier.

16. The system of claim 14 wherein said image-based classifier comprises a SNoW classifier and wherein extracting said features comprising texture, spatial structure, and image quality characteristics from said at least one image, further comprises:
splitting said at least one image into an m×n grid of blocks; and
computing LBP features for blocks among said m×n grid of blocks to concatenate said LBP features.

17. The system of claim 10 wherein said instructions for extracting said features comprising texture, spatial structure, and image quality characteristics from said at least one image, further comprises instructions configured for:
splitting said at least one image into an m×n grid of blocks; and
computing at least one LBP feature among said features for each block among said m×n grid of blocks to concatenate said at least one LBP feature into a single feature vector, said at least one LBP feature comprising said features including said texture, said spatial structure and said image quality characteristics, said at least one LBP feature comprising a local descriptor that assigns with respect to said texture an 8-bit texture value for each pixel in said at least one image, wherein said 8-bit texture value is based on a difference in values between a center pixel and eight neighbors of said center pixel at a specific radius.

18. A system for automating an image rejection process, said system comprising:
at least one image-capturing unit;
at least one processor that communicates electronically with said at least one image-capturing unit; and
a memory comprising instructions stored therein, which when executed by said at least one processor, cause said at least one processor to perform operations comprising:
extracting features from at least one image among a batch of images utilizing an (LBP Local Binary Pattern) operator to train a classifier, said features comprising texture, spatial structure, and image quality characteristics, wherein said LBP operator extracts several different orientations and types of edge features in said at least one image, giving equal priority for all patterns found;
calculating said features with respect to a test image for submission of said features to said classifier, given an operating point corresponding to a desired false positive rate;
generating at least one output from said classifier as a confidence value corresponding to a likelihood of at least one of the following: a license plate being absent in said at least one image, said license plate being unreadable, or said license plate being obstructed; and
comparing said confidence value against a threshold to determine if said at least one image should be removed from a human review pipeline, thereby reducing images requiring human review.

19. The system of claim 18 wherein said classifier comprises a random forest classifier and wherein said at least one processor processes said at least one image using an LPR engine after capturing said at least one image via said image-capturing unit.

20. The system of claim 18 further comprising:
an image-based classifier that sweeps across said at least one image to identify a center of highest confidence ROT with respect to said at least one image; and
wherein said operations further comprise computing a brightness, a contrast, and a character frequency for an ROT in said at east one image.

* * * * *